(12) United States Patent
Beaty et al.

(10) Patent No.: US 8,655,945 B2
(45) Date of Patent: Feb. 18, 2014

(54) CENTRALIZED RENDERING OF COLLABORATIVE CONTENT

(75) Inventors: Kirk A. Beaty, Goldens Bridge, NY (US); Andrzej Kochut, Elmsford, NY (US); Sambit Sahu, Hopewell Junction, NY (US); Charles O. Schulz, Ridgefield, CT (US); Hidayatullah Shaikh, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 12/947,005

(22) Filed: Nov. 16, 2010

(65) Prior Publication Data

US 2012/0124124 A1      May 17, 2012

(51) Int. Cl.
*G06F 15/16* (2006.01)
*G06F 9/455* (2006.01)

(52) U.S. Cl.
USPC .......................................... 709/203; 709/218

(58) Field of Classification Search
USPC .................. 709/203, 204–207, 217–219; 715/700–866
See application file for complete search history.

(56) References Cited

U.S. PATENT DOCUMENTS

| | | | | |
|---|---|---|---|---|
| 6,075,571 | A  * | 6/2000 | Kuthyar et al. | 348/584 |
| 7,251,675 | B1 * | 7/2007 | Kamakura et al. | 709/204 |
| 7,822,811 | B2 * | 10/2010 | Moore et al. | 709/204 |
| 7,877,443 | B2 * | 1/2011 | Lyle et al. | 709/204 |
| 7,933,956 | B2 * | 4/2011 | Hon et al. | 709/205 |
| 2005/0068905 | A1 * | 3/2005 | Dorner et al. | 370/260 |
| 2006/0244818 | A1 * | 11/2006 | Majors et al. | 348/14.08 |
| 2008/0104171 | A1 * | 5/2008 | Berberian et al. | 709/204 |
| 2009/0106347 | A1 * | 4/2009 | Harwood et al. | 709/203 |
| 2011/0145916 | A1 * | 6/2011 | McKenzie et al. | 726/19 |

OTHER PUBLICATIONS

W. Huang et al., "Virtual Machine Aware Communication Libraries for High Performance Computing" Network-Based Computing Laboratory, The Ohio State University, Columbus, OH, *SC07* Nov. 10-16, 2007, Reno, Nevada.

* cited by examiner

*Primary Examiner* — Ruolei Zong
(74) *Attorney, Agent, or Firm* — Harrington & Smith; Louis J. Percello (57) ABSTRACT

A method is disclosed that includes rendering a portion of a collaborative data stream at a first application running in a first virtual machine on a physical server. The method also includes the first application sharing the rendered portion of the collaborative data stream with a multiplicity of second applications running in second virtual machines on the physical server. Apparatus and program products are also disclosed.

22 Claims, 10 Drawing Sheets

CENTRALIZED RENDERING OF COLLABORATIVE CONTENT

BACKGROUND

This invention relates generally to virtual machines and, more specifically, relates to client and server applications running in the same physical server.

Virtual machines are software implementations of machines such as computers. Virtual machines execute programs like their physical counterparts. That is, an execution of a program on a virtual machine should be identical to execution the same program on a physical machine.

Processing power has increased to the extent that a server application and multiple client applications may be executing at the same time within a single physical server. Typically, the server application is executed in one virtual machine, while the multiple client applications are executed in multiple additional virtual machines (e.g., one virtual machine for each client application), and all of this execution occurs on a single physical server.

SUMMARY

In an exemplary embodiment, a method is disclosed that includes rendering a portion of a collaborative data stream at a first application running in a first virtual machine on a physical server. The method also includes the first application sharing the rendered portion of the collaborative data stream with a multiplicity of second applications running in second virtual machines on the physical server.

Apparatus and program products are also disclosed.

BRIEF DESCRIPTION OF THE SEVERAL VIEWS OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION

Collaborative applications include interne relay chat (IRC), video conferencing, and the like. For instance, turning to FIG. 1, a block diagram is shown of a system 100 with a physical server 105 and multiple personal computers (PCs) 120 communicating over a network 150. The physical server 105 includes the server application 110, while each of the personal computers 120-1 through 120-3 includes a respective client application 125, audio device 130, and video display 135. A collaborative data stream 155, having, e.g., embedded audio data 156 and video data 157, is sent to each client application 125 by the server application 110, via (in this example) a network 150 supporting the Internet protocol (IP). The server application 110 causes IP network protocol processing to be performed. The collaborative data steam 156 emanates from or is modified by the associated client applications 125.

Figure 1:
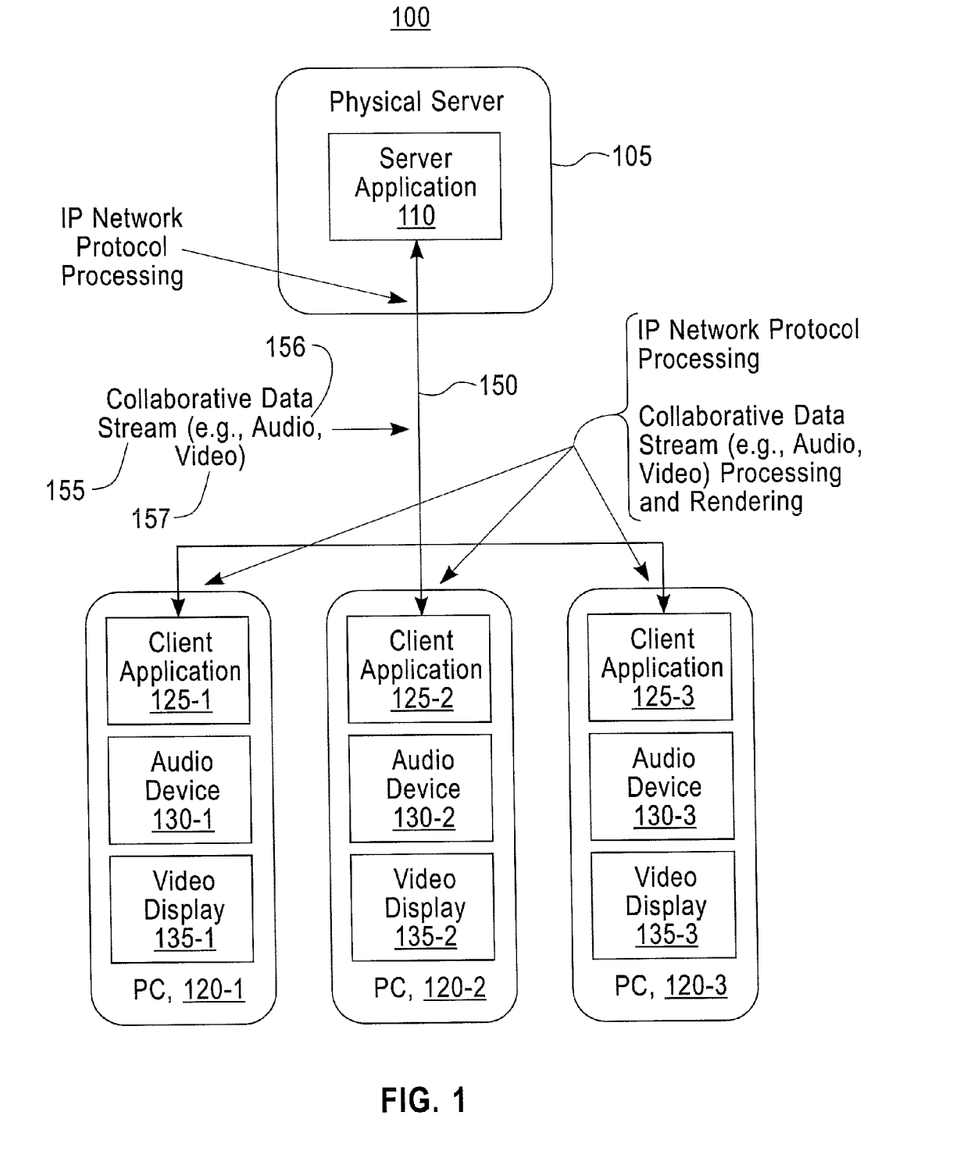
FIG. 1 is a block diagram of a system with a physical server and multiple personal computers (PCs) communicating over a network.

Further, in these types of collaborative applications, each of the user clients (e.g., client applications 125) perform similar or identical operations such as the following:

1) IP network protocol processing; and
2) Processing and rendering audio and video to the client local output devices (e.g., audio devices 130 and video displays 135).

This approach trades off total processing requirements (e.g., rendering the same image a number 'n' times), as client processing is cheap and plentiful, for reduction of network bandwidth requirements, which are limited and expensive relative to client processing.

Figure 2:
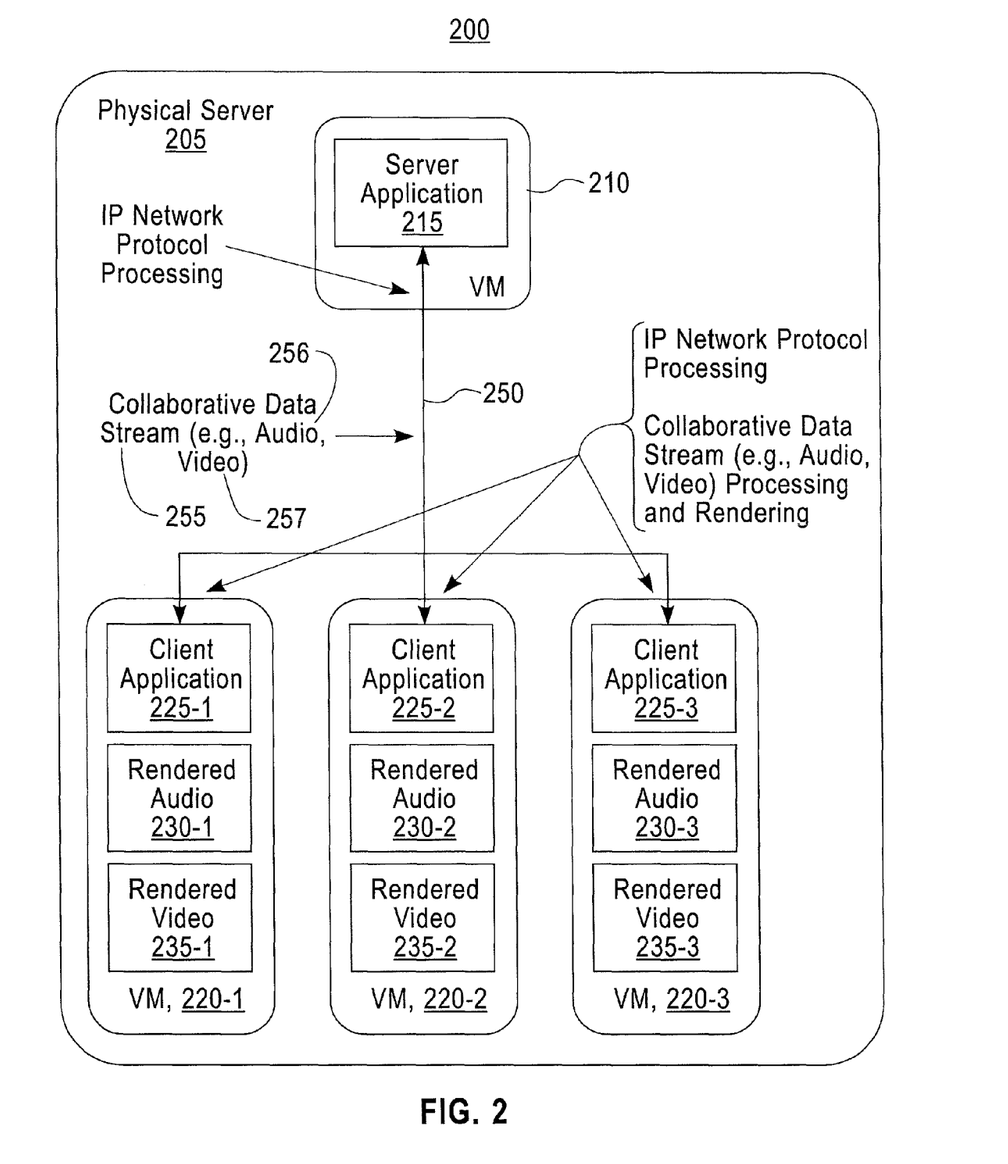
FIG. 2 is a block diagram of a system where a physical server executes a server application and multiple client applications.

Collaborative applications may also be implemented in a virtual desktop environment. FIG. 2 a block diagram of a system 200 where a physical server 205 executes a server application 215 and multiple client applications 225. The server application 215 is executed in a virtual machine (VM) 210, while each client application 225 is executed in a corresponding virtual machine (VM) 220. Similar to FIG. 1, a collaborative data stream 255, having, e.g., embedded audio data 256 and video data 257, is sent to each client application 225 by the server application 210, via an internal network 250 (that is, internal to the physical server 205) supporting the Internet protocol (IP). The server application 215 causes IP network protocol processing to be performed.

This type of virtual desktop environment results in the same rendering process being performed multiple times on a single physical server 205. That is, each client application 225 performs both IP network protocol processing and collaborative data stream processing and rendering, e.g., to process and render audio data 256 and video data 257 into rendered audio 230 and rendered video 235, respectively.

To correct these defects, in a virtual system when the application server is located on the same physical server (i.e., in a VM) as one or more clients (also in VMs), this replication of processing can be reduced by processing and rendering the stream at the server VM and sharing the rendered stream with the collocated clients via, e.g., a low overhead protocol. The term "low overhead protocol" refers to. e.g., protocols which are commonly used in server clustering, where routing and failure tolerance are not as important issues as they are with internetworking. In these instances, protocols such as shared memory are used because they typically provide better bandwidth, lower latency, and significantly less protocol processing. See, e.g., Huang et al., "Virtual Machine Aware Communication Libraries for High Performance Computing", Conference on High Performance Networking and Computing, Proceedings of the 2007 ACM/IEEE conference on Supercomputing (2007).

This takes advantage of the fact that processing power is expensive (e.g., limits scalability) in a virtualized environment, network bandwidths are very high (e.g., shared memory verses serial links), and routable, loss tolerant protocols are unnecessary within a single virtualized physical server.

Figure 3:
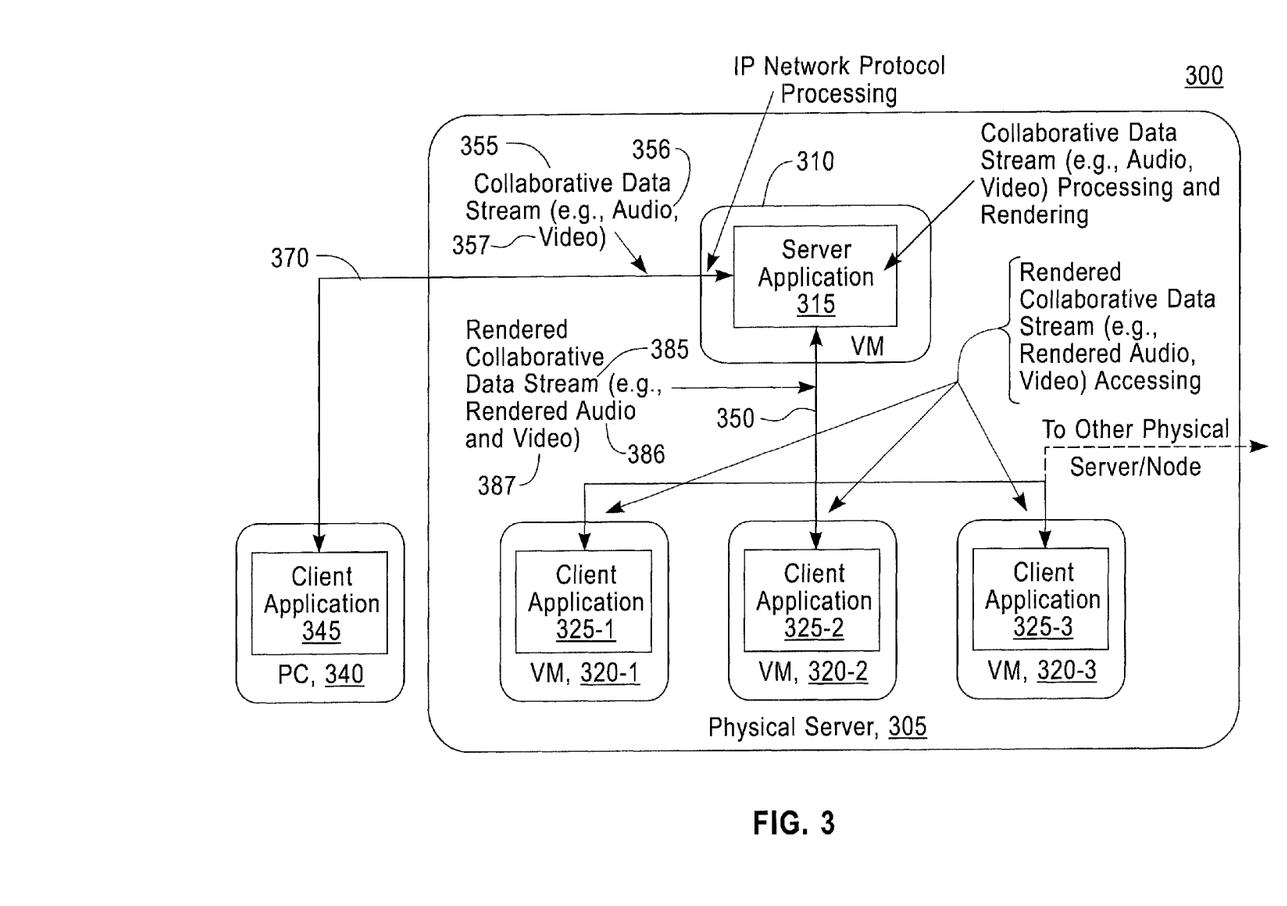
FIG. 3 is another block diagram of a system where a physical server executes a server application and multiple client applications, in accordance with an exemplary embodiment of the instant invention.

FIG. 3 is illustrative of an exemplary system 300 where a physical server 305 executes a server application 315 and multiple client applications 325, in accordance with an exemplary embodiment of the instant invention. In this example, the server application 315 is executed by virtual machine (VM) 310, and each client application 325 is executed by individual virtual machines 320. In this example, there are three virtual machines 320-1 through 320-3 and three client applications 325-1 through 325-3, but this is merely exemplary. The physical server 305 also is connected to the personal computer 340 and its client application 345 via a network (e.g., IP network) 370. The server application 310 still uses IP network protocol processing to send a collaborative data stream 355 (including audio data 356 and video data 357) to client application 345 in personal computer 340.

In this example, the server application 315 processes and renders the collaborative data stream 355 (including audio data 356 and video data 357) to produce a rendered collaborative data stream 385, including, e.g., rendered audio 386 and rendered video 387. The client applications 325 access the rendered collaborative data stream 385 using the rendered stream network 350, which is a network that is typically internal to the physical server 305. However, it is also possible that the rendered stream network 350 can also extend outside the physical server given an appropriate clustering physical network such as Infiniband (described in more detail below), which will support very high bandwidth, low latency memory to memory transfers between nodes on an Infiniband network. In this manner, the server application 315 performs rendering once and the client applications 325 access the rendered data stream, thereby improving overall performance.

In this exemplary approach, the client applications 325, which are collocated with the server application 315 on the physical server 305, would take advantage of this optimization while the server application 305 will concurrently produce traditional IP based streams to remote clients (e.g., stand alone clients 345 or client VMs on other physical servers).

Figure 4:
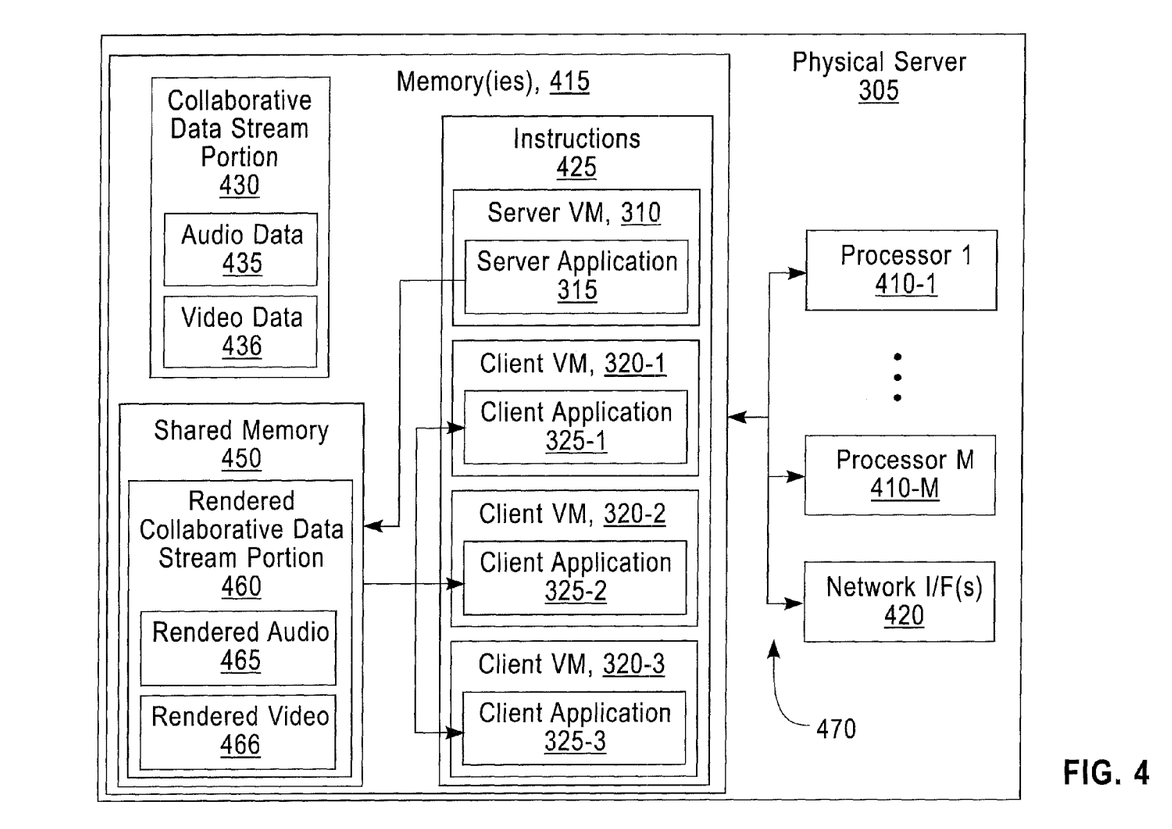
FIG. 4 is a block diagram of the physical server of FIG. 3.

Referring now to FIG. 4, a block diagram of the physical server of FIG. 3 is shown. The physical server 415 includes one or more processors 410, and in this example, M processors 410-1 through 410-M. The physical server 305 also includes one or more (typically multiple) network interfaces 420, and one or more memories 415. Typically, there are multiple memories 415, but for clarity of exposition, these memories 415 are shown as a single block in FIG. 4. These devices are interconnected via a network 470, which can include one or more buses (not shown).

The memories 415 include instructions 425, which include a "server" virtual machine 310 executing a server application 315, and multiple "client" virtual machines 320-1 through 320-3, each virtual machine 320 executing a corresponding client application 325-1 through 325-3. That is, when the instructions 425 are loaded into one or more of the processors 410 and executed by the one or more processors 410, the physical server is made to create, e.g., the server virtual machine 310, which then executes the server application 315. It is noted that the "server" and "client" virtual machines may be instances of the same virtual machine or may be different virtual machines.

The memories 415 include a collaborative data stream portion 430, which is a portion of the collaborative data stream 355. The collaborative data stream portion 430 includes audio data 435 and video data 436. The server application 315 processes the collaborative data stream portion 430 and creates a rendered collaborative data stream portion 460. The rendered collaborative data stream portion 460 includes in this example rendered audio 465 and rendered video 466.

As discussed in more detail below, one exemplary technique for the server application 315 to share the rendered collaborative data stream portion 460 with the client applications 325 is by providing a shared memory 450, e.g., shared memory pages between the server application 315 and client applications 325. The server application 315 writes into the shared memory 450 and the client applications 325 read from the shared memory 450.

Figure 5:
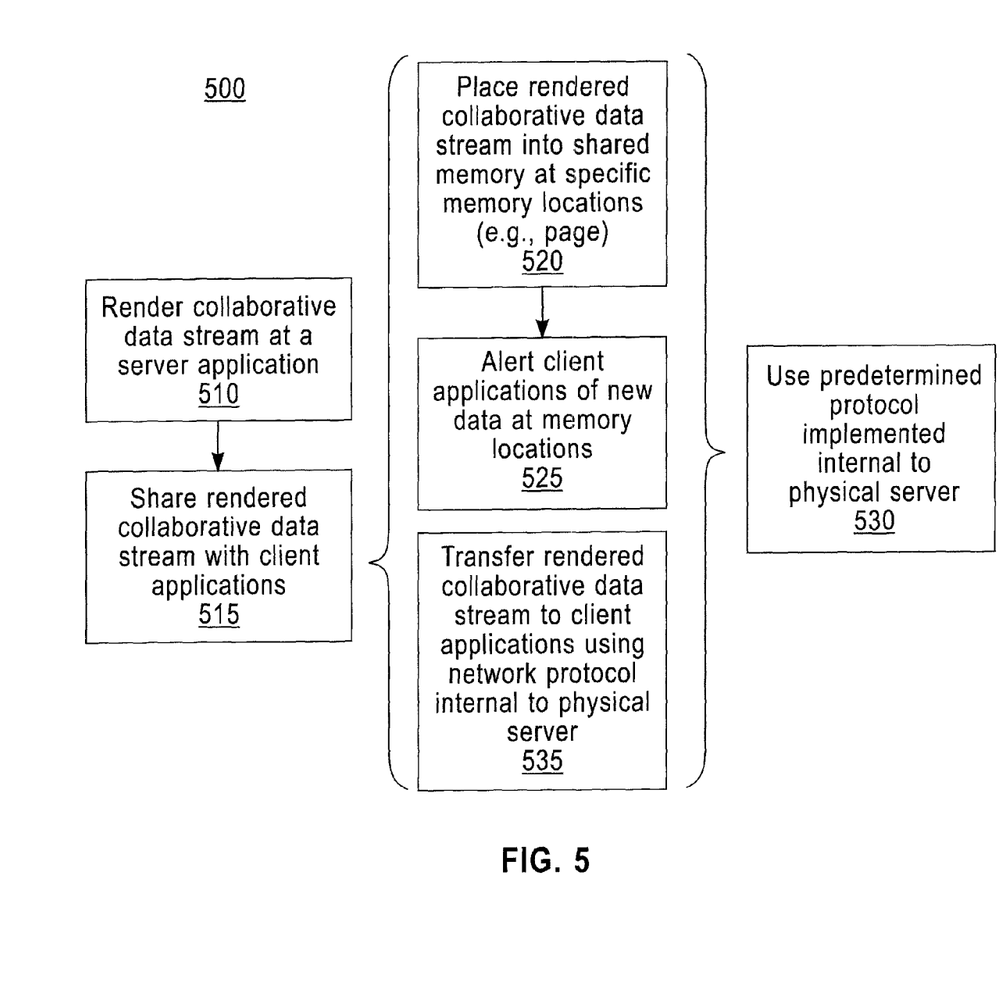
FIG. 5 is a flowchart of an exemplary method performed by a server application in an exemplary embodiment.

FIG. 5 is a flowchart of an exemplary method 500 performed by server application 315 in an exemplary embodiment. Method 500 begins in block 510, when the server application 315 renders the collaborative data stream (e.g., collaborative data stream portion 430) and therefore creates a rendered data stream (e.g., rendered collaborative data stream portion 460). An exemplary embodiment of actions taken in block 510 is shown in more detail in FIG. 11.

In block 515, the rendered collaborative data stream (e.g., rendered collaborative data stream portion 460) is shared with the client applications 325. In an exemplary embodiment, this is performed by using a predetermined protocol internal to the physical server 305 (block 530). That is, the sharing occurs internal to the physical server 305 using a predetermined protocol.

The specific predetermined protocol used to transfer the pre-rendered data between the server application 315 and the client applications 325 is an implementation option. For instance, in block 520, the server application 315 places a rendered collaborative data stream (e.g., rendered collaborative data stream portion 460) into a shared memory 450, such as at specific locations (e.g., defined by one or more pages of memory). In block 525, the server application 315 alerts the client applications 325 of new data at the specific memory locations. Such alert could be via a message, a signal, or any other technique. The predetermined protocol would therefore define, e.g., the alert format and handshaking between the server application 315 and client applications 325 in order to effect sharing of the rendered collaborative data stream.

As another example, the server application 315 transfers the rendered collaborative data stream (e.g., rendered collaborative data stream portion 460) to the client applications 325 via a network protocol (block 535), such as Infiniband. Infiniband is an industry-standard specification that defines an input/output architecture used to interconnect servers, communications infrastructure equipment, storage and embedded systems. InfiniBand is a true fabric architecture that leverages switched, point-to-point channels with data transfers today at up to 120 gigabits per second, both in chassis backplane applications as well as through external copper and optical fiber connections. The network protocol is defined internal to the physical sever 305. That is, the network protocol is used to transfer data internal to the physical server 305.

Figure 6:
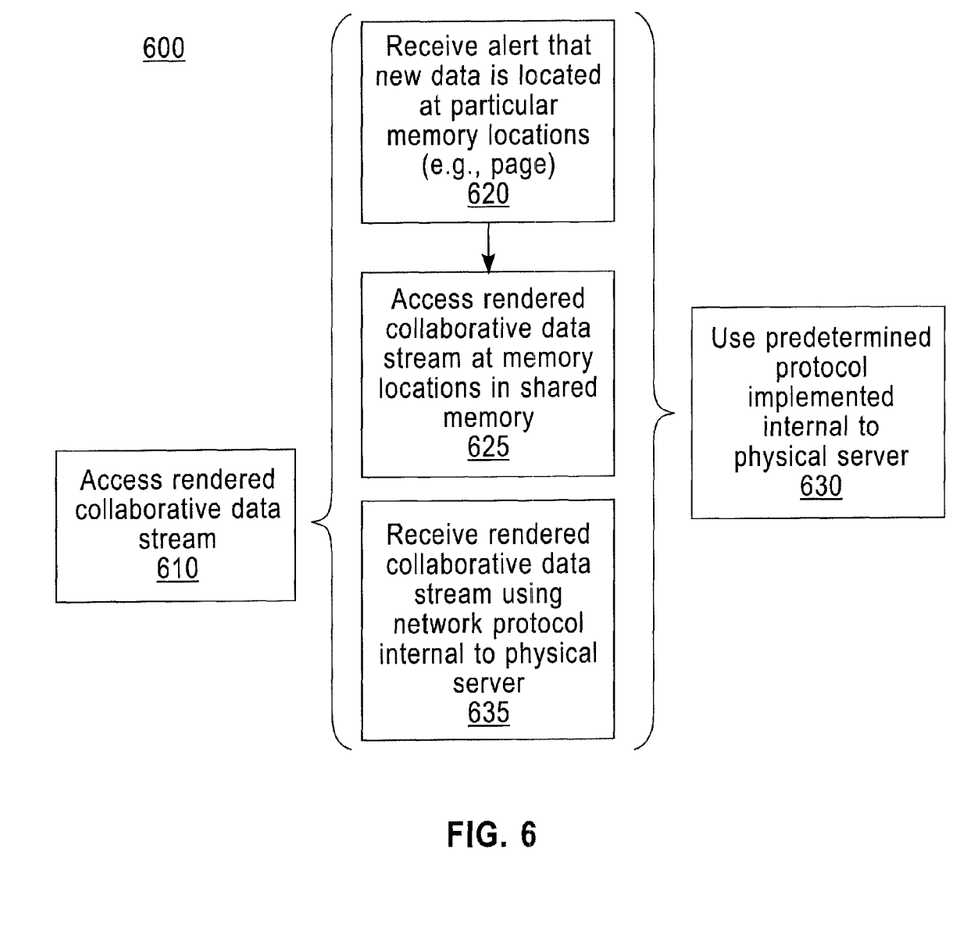
FIG. 6 is a flowchart of an exemplary method performed by a client application in an exemplary embodiment.

Referring now to FIG. 6, a flowchart is shown of an exemplary method 600 performed by a client application 325 in an exemplary embodiment. In this example, a client application 325 accesses (block 610) a rendered collaborative data stream, such as rendered collaborative data stream portion 460. Again, in an exemplary embodiment, the access may take place using a predetermined protocol implemented internal to the physical server 305 (block 630). In other words, the accessing occurs internal to the physical server 305 using a predetermined protocol.

As noted above, the specific predetermined protocol used to transfer the pre-rendered data between the server application 315 and the client applications 325 is an implementation option. Illustratively, in block 620, the client application 325 receives an alert that the server application 315 has placed new data at specific memory locations (e.g., defined by one or more pages of memory) in a shared memory 450. As described above, such alert could be via a message, a signal, or any other technique. In block 625, the client application 325 accesses the rendered collaborative data stream (e.g., rendered collaborative data stream portion 460) at the memory locations in the shared memory 450. The predetermined protocol would therefore define, e.g., the alert format and handshaking between the server application 315 and client applications 325 in order to effect sharing of the rendered collaborative data stream.

An additional example is related to block 635. In this block, the client application 325 receives rendered collaborative data stream (e.g., rendered collaborative data stream portion 460) from the server application 315 via a network protocol, such as Infiniband. The network protocol is defined internal to the physical sever 305. That is, the network protocol is used to transfer data internal to the physical server 305.

Figure 7:
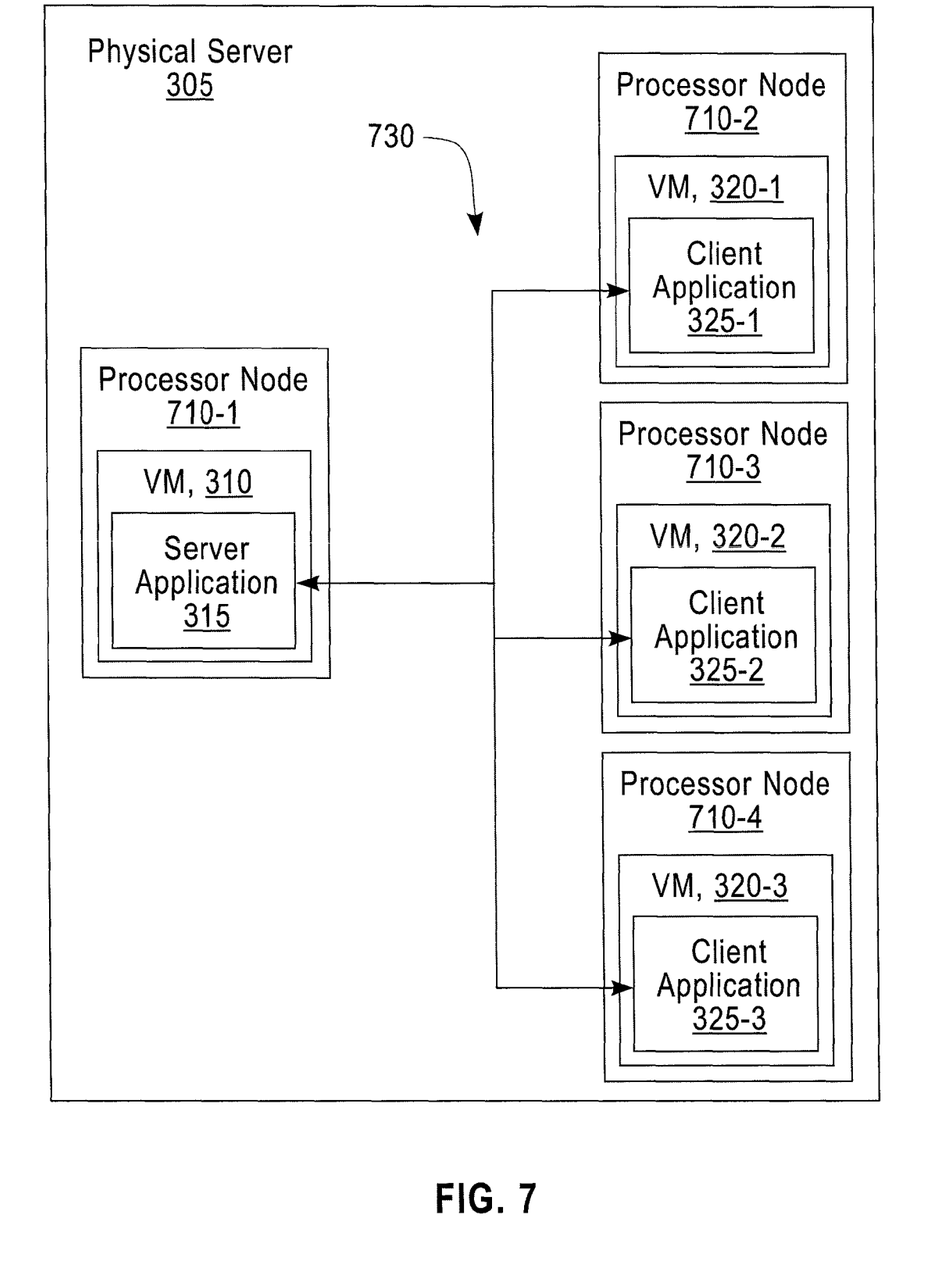
FIG. 7 is a block diagram of a configuration of a physical server in an exemplary embodiment.

Turning now to FIG. 7, a block diagram is shown of a configuration of a physical server in an exemplary embodiment. FIG. 7 is an example of a configuration of physical server 305 that uses Infiniband or other network protocols. The physical server 305 includes processor nodes 710-1 through 710-4. Each processor node 710 includes one or more processors and one or more memories (not shown in FIG. 7). Processor node 710-1 includes the server virtual machine 310 and the server application 315. Each of the processor nodes 710-2, 710-3, and 710-4 includes a corresponding and respective virtual machine 320-1, 320-2, and 320-3, each of which includes a corresponding client application 325-1, 325-2, or 325-3.

In this example, a network 730 interconnects the processor nodes 710. The network uses, e.g., an Infiniband network protocol. Such protocols may support, e.g., multicasting, which means that a processor node 710-1, under control of the server application 315 (and its corresponding virtual machine 310), could broadcast a rendered collaborative data stream portion 460 to each of the processor nodes 710-2, 710-3, and 710-4 at the same time. Alternatively, the processor node 710-1 could share the rendered collaborative data stream portion 460 using other techniques, such as serially sending the rendered collaborative data stream portion 460 to each of the other processor nodes 710-2, 710-3, and 710-4.

Figure 8:
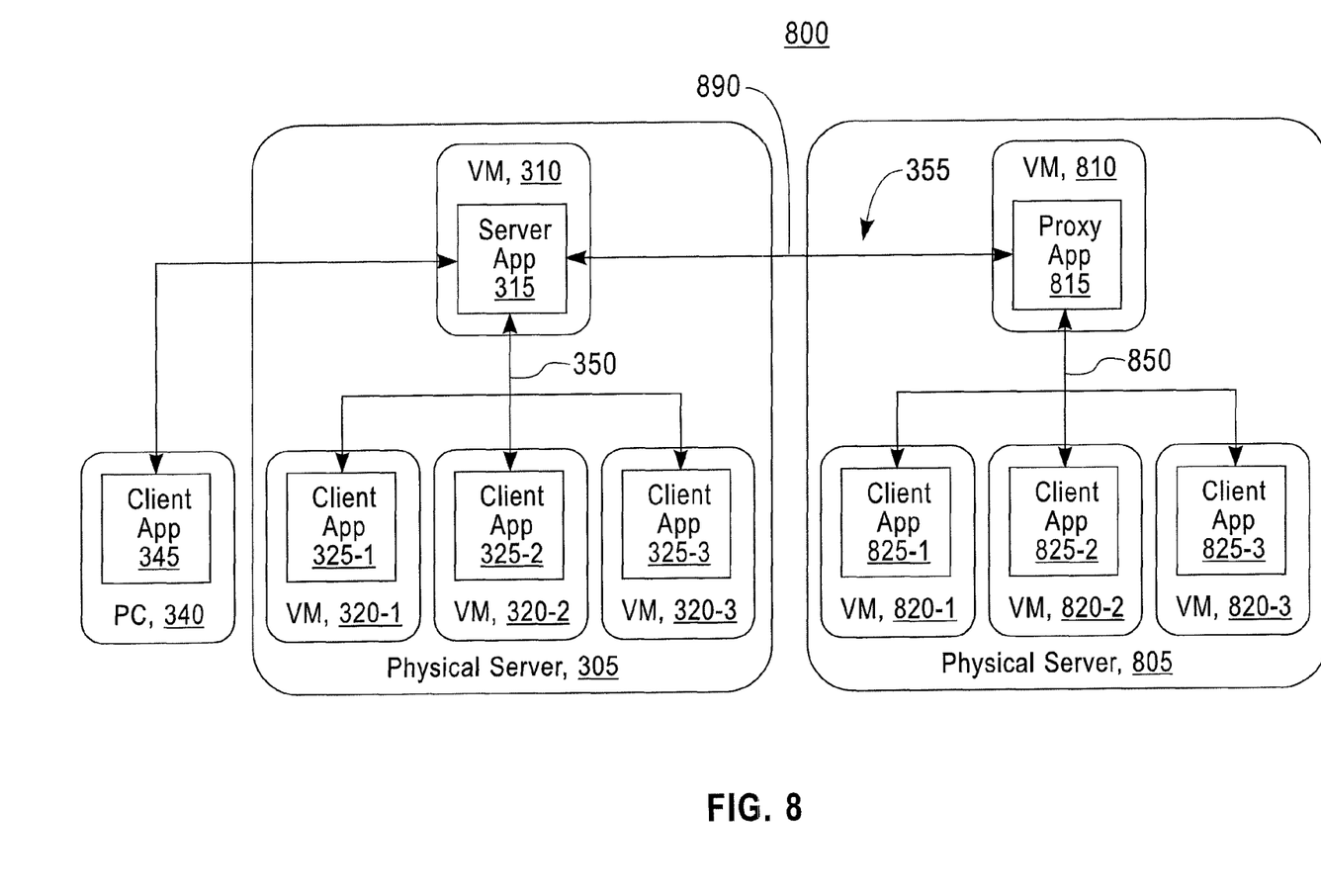
FIG. 8 is another block diagram of a system where a physical server executes a proxy application and multiple client applications, in accordance with an exemplary embodiment of the instant invention.

An extension of the above approaches includes when several client applications are collocated on a server which is remote from the collaboration server. In this case, a 'proxy' collaboration server could be added to this remote physical server, and the proxy server will centrally render for all of the clients which are located on this physical server. FIG. 8 is an example of this and is another block diagram of a system 800 where a physical server 805 executes a server application (proxy application, "app", 815) and multiple client applications 825-1 through 825-3, in accordance with an exemplary embodiment of the instant invention. In this example, the proxy server application 815 is a server application executed on the remote physical server 805 and executed in a virtual machine 810. Each of the client applications 825-1 through 825-3 is executed in a corresponding virtual machine 820-1 through 820-3. The proxy server application 815 communicates via network 850 with the client applications 825, through techniques previously described.

The physical server 805 communicates with the physical server 305 via a network 890, which is typically an IP-based network. A collaborative data stream 355 is communicated between server applications 315 and 815. The proxy server application 815 would then render and share the collaborative data stream 355, as previously described (e.g., with reference to FIGS. 5-7).

Figure 9:
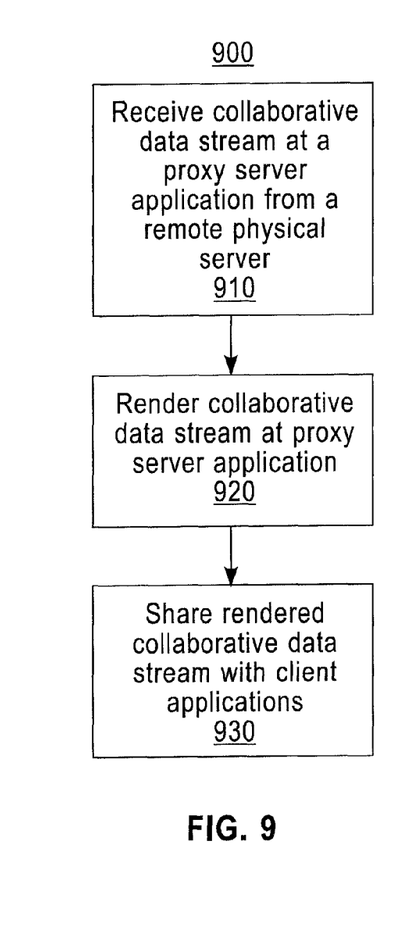
FIG. 9 is a flowchart of an exemplary method performed by a proxy server application in accordance with an exemplary embodiment.

This is described in FIG. 9, which is a flowchart of an exemplary method 900 performed by a proxy server application 815 in accordance with an exemplary embodiment. The example of FIG. 9, the proxy server application 815 receives the collaborative data stream 355 in block 910. In block 920, the proxy server application 815 renders (as previously described and described in more detail with reference to FIG. 11) the collaborative data stream, and in block 830, the proxy server application 815 shares (as described previously) the rendered collaborative data stream with the client applications 825-1 through 825-3.

Figure 10:
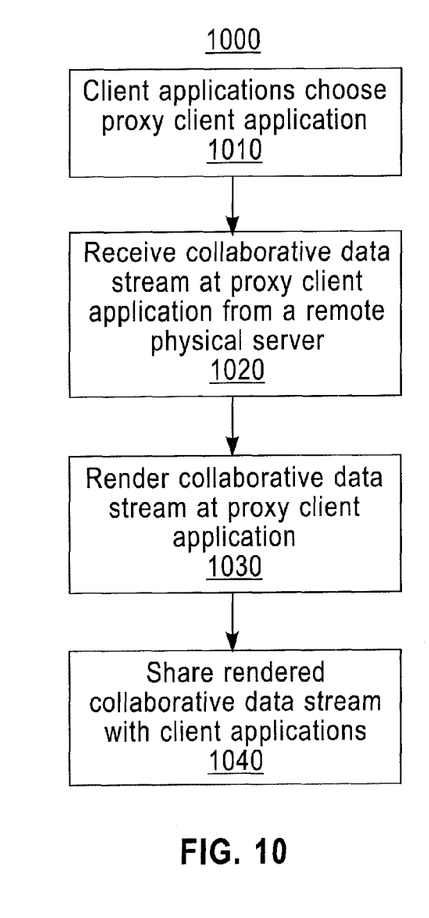
FIG. 10 is a flowchart of an exemplary method performed by applications in a physical server in accordance with an exemplary embodiment.

A further extension of the above techniques includes where the client virtual machines 820 (e.g., under control of an associated client application 825) on the remote physical server 805 collaborate to choose one rendering client which will share its rendered data with the remaining client applications on that physical server 10. See FIGS. 8 and 10. FIG. 10 is a flowchart of an exemplary method performed by applications in a physical server in accordance with an exemplary embodiment. In this example, there would be four client applications 820-1, 820-2, 820-3, and 815.

The client applications 820-1, 820-2, 820-3, and 815 choose a proxy client application (e.g., proxy application 815). The proxy client application 815 then receives the collaborative data stream 355 in block 1020. In block 1030, the proxy client application 815 renders the collaborative data stream, and in block 1040, the proxy client application 815 shares the rendered collaborative data stream with the other client applications 825-1 through 825-3.

Figure 11:
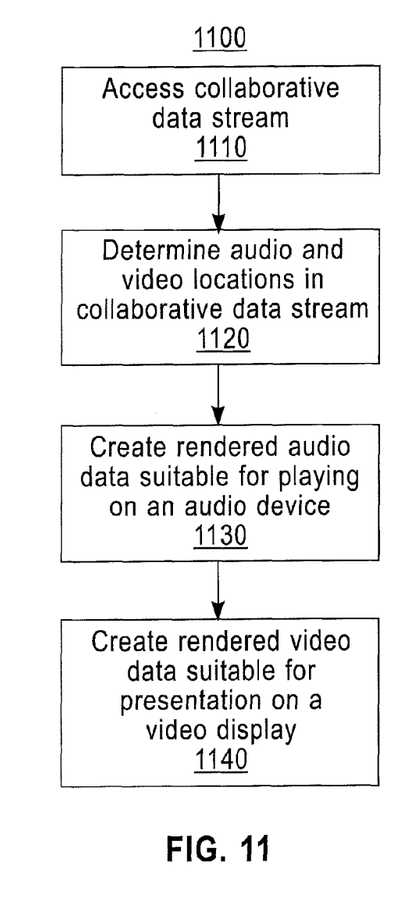
FIG. 11 is a flowchart of an exemplary method for rendering a collaborative data stream.

FIG. 11 is a flowchart of an exemplary method 1100 for rendering a collaborative data stream. In an exemplary embodiment, method 1100 would be performed by an application 315/815. In block 1110, the application 315/815 accesses a collaborative data stream. In block 1120, the application 315/815 determines locations of audio data and video data (as examples) in the collaborative data stream 355. The application 315/815 then creates, from the audio data, rendered audio data (e.g., rendered audio 465) that is suitable for playing an on audio device (block 1130). In an exemplary embodiment, the rendered audio 465 includes a sequence of values which represent the amplitude of an audio waveform at regular intervals. In block 1140, the application 315/815 creates, from the video data, rendered video data (e.g., rendered video 466) suitable for presentation on a video display. In an exemplary embodiment, the rendered video 466 includes a series of pixel maps which represent the video frames at regular intervals such as 30 times per second of normal television (TV). Each pixel is represented by a few bits of data which encodes the color and intensity of the pixel. These audio and video data are merely exemplary, and other audio and video data may be used.

Figure 12:
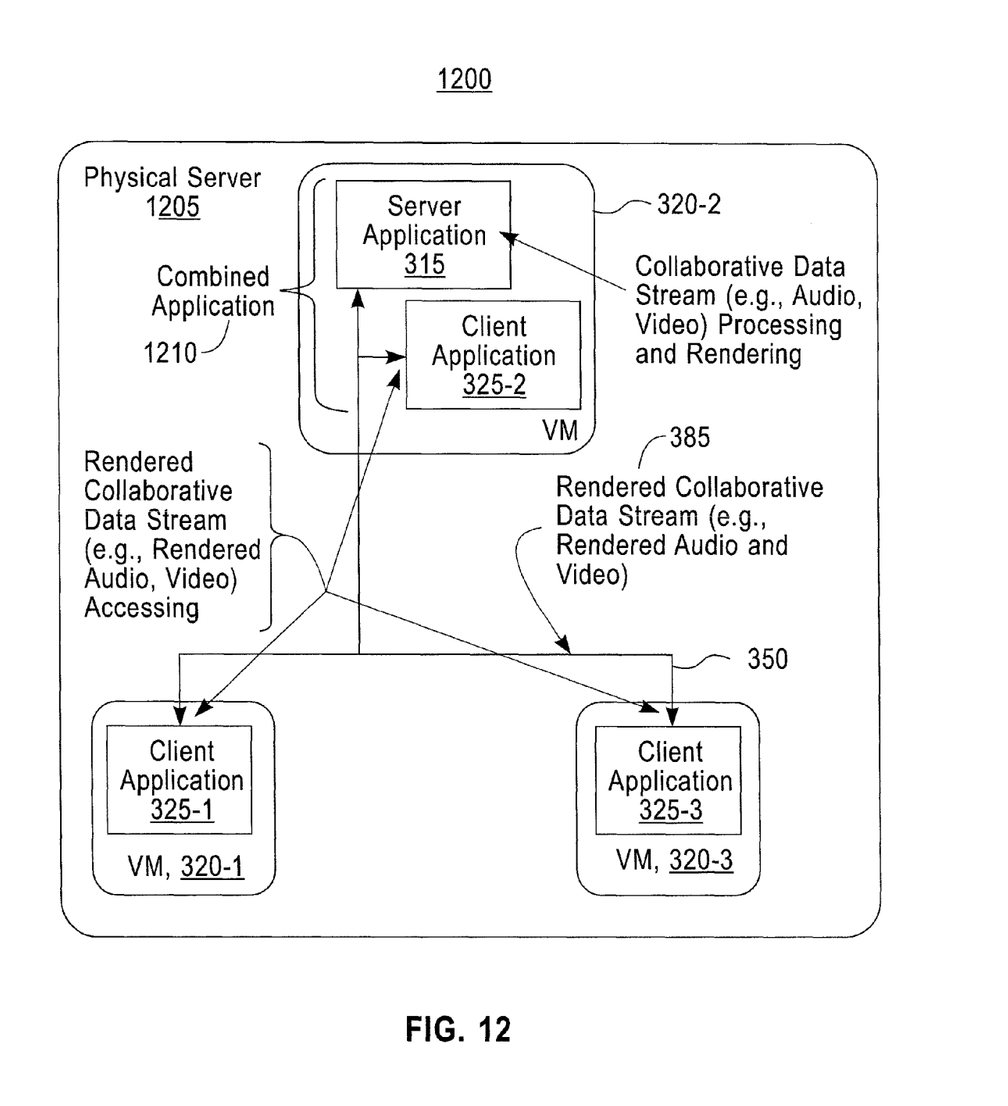
FIG. 12 is another block diagram of a system where a physical server executes a server application and multiple client applications, in accordance with an exemplary embodiment of the instant invention.

FIG. 12 illustrates another exemplary embodiment, where the system 1200 includes a physical server 1205. In this example, one virtual machine 320 (in this case, 320-2) supports both a server application 315 and a client application 325 (325-2 in this case). The server application 315 performs the collaborative data stream processing and rendering, and the client application 325-2 performs rendered collaborative data stream accessing. Additionally, the server application 315 and client application 325-2 can be combined into a combined application 1210. The combined application 1210 would then include a portion directed to the server application 315 and a portion directed to the client application 325-2.

As should be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or assembly language or similar programming languages. Such computer program code may also include code for field-programmable gate arrays, such as VHDL (Very-high-speed integrated circuit Hardware Description Language).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A method comprising:
rendering a portion of a collaborative data stream at a first application running in a first virtual machine on a physical server;
providing a shared memory internal to said physical server;
storing said rendered portion of said collaborative data stream in said shared memory; and
sharing, by the first application, from said shared memory, the rendered portion of the collaborative data stream with a plurality of second applications running in second virtual machines on said physical server,
said first and second virtual machines being software implementations of separate physical machines running on said physical server,
whereby said first application renders said portion of said collaborative data stream once and said second applications access said rendered portions of said collaborative data stream from said shared memory.

2. The method of claim 1, wherein the first application comprises a server application and each of the plurality of second applications comprises a client application.

3. The method of claim 1, wherein the physical server is a first physical server and wherein the method further comprises receiving the portion of the collaborative data stream from a second physical server.

4. The method of claim 3, wherein:
each of the plurality of second applications comprises a client application; and
the method further comprises selecting the first application from the plurality of client applications.

5. The method of claim 3, wherein the first application comprises a server application and each of the plurality of second applications comprises a client application.

6. The method of claim 1, wherein the portion of a collaborative data stream comprises audio data and video data, and wherein rendering further comprises rendering the audio data to create rendered audio data and rendering the video data to create rendered video data.

7. The method of claim 1, wherein sharing further comprises the first application transferring the rendered portion of the collaborative data stream to the plurality of second applications via a network internal to the physical server.

8. The method of claim 1, wherein the first application is a portion of a combined application, and one of the second applications is another portion of the combined application.

9. A computer program product comprising:
a non-transitory computer-readable storage medium having computer-readable program code embodied therewith, the computer-readable program code comprising:
code for rendering a portion of a collaborative data stream at a first application running in a first virtual machine on a physical server;
code for providing a shared memory internal to said physical server;
code for storing said rendered portion of said collaborative data stream in said shared memory; and
code for sharing, by the first application, from said shared memory, the rendered portion of the collaborative data stream with a plurality of second applications running in second virtual machines on said physical server,
said first and second virtual machines being software implementations of separate physical machines running on said physical server,
whereby said first application renders said portion of said collaborative data stream once and said second applications access said rendered portions of said collaborative data stream from said shared memory.

10. The computer program product of claim 9, wherein the first application comprises a server application and each of the plurality of second applications comprises a client application.

11. The computer program product of claim 9, wherein the physical server is a first physical server and wherein the computer readable program code further comprises code for receiving the portion of the collaborative data stream from a second physical server.

12. The computer program product of claim 11, wherein:
each of the plurality of second applications comprises a client application; and
the computer readable program code further comprises code for selecting the first application from the plurality of client applications.

13. The computer program product of claim 11, wherein the first application comprises a server application and each of the plurality of second applications comprises a client application.

14. The computer program product of claim 9, wherein the portion of a collaborative data stream comprises audio data and video data, and wherein rendering further comprises rendering the audio data to create rendered audio data and rendering the video data to create rendered video data.

15. The computer program product of claim 9, wherein sharing further comprises the first application transferring the rendered portion of the collaborative data stream to the plurality of second applications via a network internal to the physical server.

16. An apparatus comprising:
at least one processor; and
at least one memory including instructions,
the at least one processor configured, in response to executing the instructions, to cause the apparatus to perform at least the following:
creating a first virtual machine on the apparatus;
creating a plurality of second virtual machines on the apparatus;
rendering a portion of a collaborative data stream at the first application running in the first virtual machine;
providing a shared memory internal to said apparatus;
storing said rendered portion of said collaborative data streaming said shared memory; and
sharing, by the first application, from said shared memory, the rendered portion of the collaborative data stream with a plurality of second applications running in the second virtual machines,
said first and second virtual machines being software implementations of separate physical machines running on said apparatus,
whereby said first application renders said portion of said collaborative data stream once and said second applications access said rendered portions of said collaborative data stream from said shared memory.

17. The apparatus of claim 16, wherein the first application comprises a server application and each of the plurality of second applications comprises a client application.

18. The apparatus of claim 16, wherein the at least one processor is further configured, in response to executing the instructions, to cause receiving the portion of the collaborative data stream from another apparatus.

19. The apparatus of claim 18, wherein:
   each of the plurality of second applications comprises a client application; and
   the at least one processor is further configured, in response to executing the instructions, to cause selecting the first application from the plurality of client applications.

20. The apparatus of claim 18, wherein the first application comprises a server application and each of the plurality of second applications comprises a client application.

21. The apparatus of claim 16, wherein the portion of a collaborative data stream comprises audio data and video data, and wherein rendering further comprises rendering the audio data to create rendered audio data and rendering the video data to create rendred video data.

22. The apparatus of claim 16, wherein the apparatus further comprises a network internal to the apparatus and wherein sharing further comprises the first application transferring the rendered portion of the collaborative data stream to the plurality of second applications via the network.

* * * * *